Patented Nov. 16, 1948

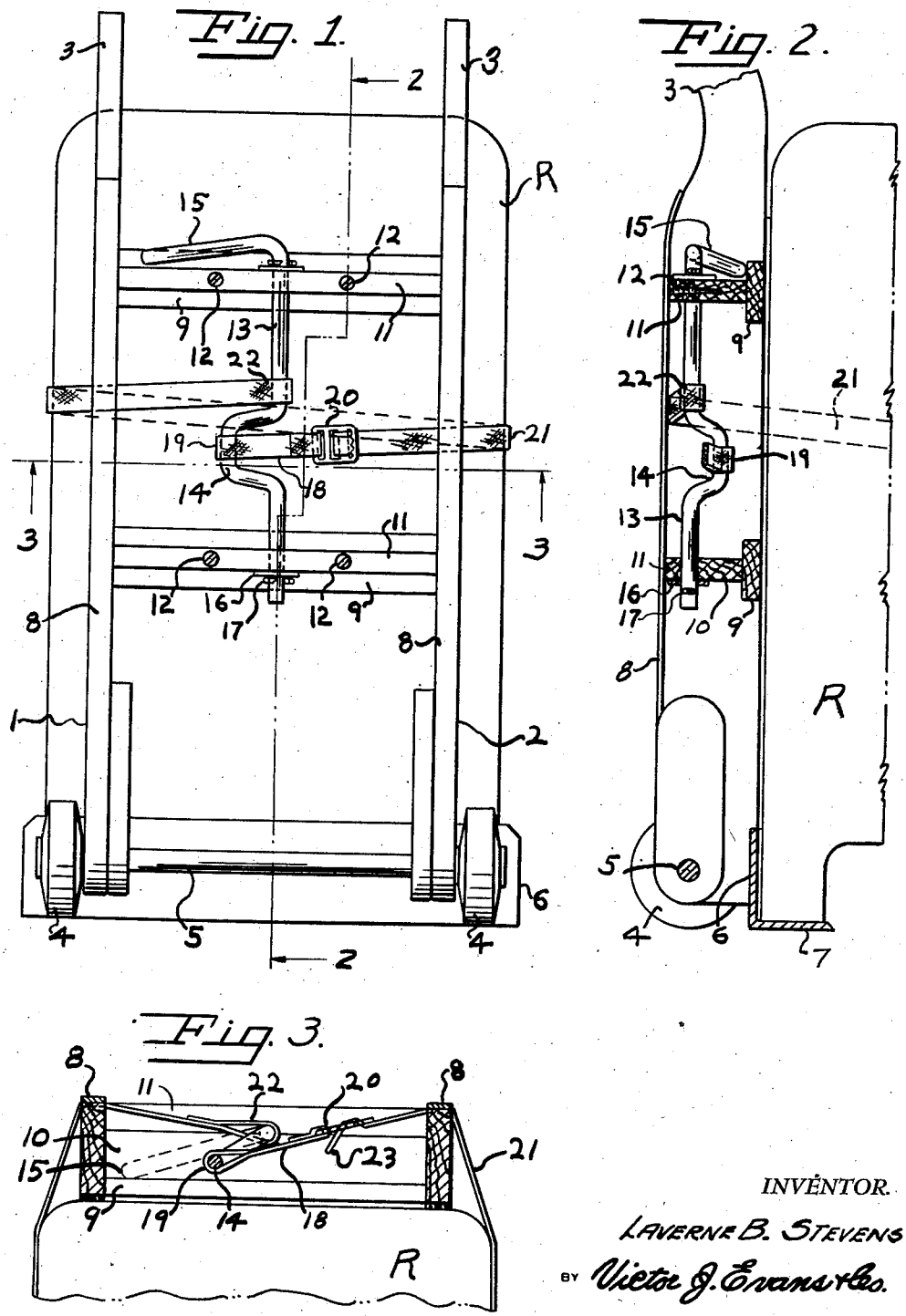

2,453,821

UNITED STATES PATENT OFFICE 2,453,821

STRAP TIGHTENER

Laverne B. Stevens, Jackson, Miss.

Application November 21, 1946, Serial No. 711,309

1 Claim. (Cl. 280—179)

My present invention relates generally to hand trucks of the two wheel type, and more specifically to an improved strap tightener employed with web straps for securely fastening a load upon a truck of this type. While the quick detachable fastening means and the strap tightener of my invention are especially designed for securing refrigerators and similar appliances on a hand truck, it will be understood that other merchandise and commodities may be fastened to other supports and securely retained in place by the tightening device of my invention.

The primary object of my invention is the provision of quick detachable means for strapping the load by hand upon the truck, and then further tightening or stretching the retaining strap by mechanical means to eliminate the possibility of shifting and displacement of the load, and to insure a rigid attachment of the load to the truck.

In carrying out my invention I employ a minimum number of parts that may readily be manufactured at low cost of production, and the parts may readily be assembled to provide a rugged, strong, and effective quick detachable fastening device that is simple in construction and which may be manipulated with facility.

To this end the invention consists in certain novel combinations and arrangements of parts hereinafter described and more specifically set forth in my appended claim.

In the accompanying drawings I have illustrated one complete example of a physical embodiment of my invention wherein the parts are combined and arranged in accord with one mode I have devised for the practical application of the principles of my invention. It will be understood that various changes and alterations may be made in these exemplifying drawings and mechanical structures within the scope of my claim without departing from the principles of the invention.

Figure 1 is a view in rear elevation of a loaded hand truck having a fastening strap with which my invention is embodied for securely retaining the load on the truck.

Figure 2 is a vertical sectional view as at line 2—2 of Fig. 1 and showing an appliance attached to or fastened in place on the truck.

Figure 3 is a transverse sectional view at line 3—3 of Fig. 1 showing the strap tightener in use.

For convenience in understanding the general arrangement and relation of parts, and to illustrate the utility of the strap tightener I have shown in the drawings a well known type of two-wheel hand truck having a frame including the usual side bars or laterally spaced rails 1 and 2 that terminate at their free ends in handles or hand grips 3, 3.

The two spaced wheels 4, 4, are journaled on an axle 5 mounted in the front ends of the side bars, and the usual angle iron cross bar or angular rack, including integral flanges 6 and 7, unites the front or lower ends of the side bars.

The side bars may be equipped with the customary metal strips or wear straps 8, 8, which are fastened by screws on their edges, and other necessary or desirable fixtures may of course be employed to complete the hand truck.

For mounting the fastening straps and the strap tightener of my invention on the truck as part of its permanent equipment, the two parallel side bars are united by a pair of spaced T-shaped braces located at a suitable point between the wheels and the handles of the truck, each of which braces consists of a flat load-supporting bar 9, and a brace bar 10 turned on edge and secured at right angles to the load-supporting bar 9.

The brace bar 10 may be provided with an outer edge strip 11 fastened thereto by screws 12 to facilitate the mounting of the strap tightener which is supported in these cross bars or braces.

The strap tightener includes a rotary crank-bar having two alined shanks 13, 13, and an intermediate off-set U-shaped portion or crank 14, and the crank-bar is centrally located within the truck frame with the shank portions journaled in complementary bearing holes in the cross braces 10, 10.

One end of the crank-bar is fashioned with an angular handle or crank 15, and the other end of the crank-bar is provided with a washer 16 and cotter pin 17 to retain the device against longitudinal displacement.

The crank-bar 14 is equipped with a short, preferably wide strap 18, of web fabric, leather, or other suitable material, which is securely anchored by a loop 19 to the crank, and its free end is provided with a suitable buckle 20.

A long complementary strap 21 is anchored at 22 to one of the shanks of the crank-bar, and its free end is adapted, as at 23, to co-act with the buckle through which it is threaded.

After the long strap has been wrapped around the truck frame, and the load, here indicated by the letter R as a refrigerator, the two straps are buckled and tightened by hand in the usual manner. Then to take up slack and tighten the straps, the handle 15 is grasped in order to turn or swing the crank-bar through an angle of slightly more than one hundred and eighty degrees until the handle 15 contacts with the bar 9 as indicated in Fig. 3. In this position the crank-bar 14 is located in a plane in advance of a line between the shank portions and the contacting end of the handle 15, and as seen in Fig. 3 the pull or strain on strap 18, and the pull of strap 21 on the shank, both tend to hold the handle 15 in engagement with the stop or cross brace 9.

In some instances the long strap 21 may be slipped through slots under the wear strips 8, 8, as it is wrapped around the frame and its load.

For a quick detachment of the fastening strap, the cranking movement of the handle 15 is reversed, i. e. the handle is swung to the right in Fig. 1 to loosen the buckled straps, and the straps may then be unbuckled in usual manner to release the load.

Having thus fully described my invention, what I claim as new and desire to secure by Letters Patent is:

A quick-detachable fastening means including a rotary crank-bar having supporting bearings, an end crank-handle, and a crank portion disposed in a plane at a slightly different plane from the crank handle, the combination therewith of a strap anchored at one end to the crank and equipped with a buckle at its other end, and a second wrap-around strap anchored in off-set position to the bolt with its free end for engagement with the buckle.

LAVERNE B. STEVENS.

REFERENCES CITED

The following references are of record in the file of this patent:

UNITED STATES PATENTS

| Number | Name | Date |
|---|---|---|
| 804,863 | Kempton | Nov. 21, 1905 |
| 2,165,603 | Yeats | July 11, 1939 |
| 2,390,232 | Venditty | Dec. 4, 1945 |